Dec. 3, 1946.  L. G. BOSTWICK ET AL  2,411,865
SUBMARINE SIGNALING DEVICE
Filed Feb. 10, 1944  6 Sheets-Sheet 1

INVENTORS L. G. BOSTWICK
J. H. KING
BY
Walter C. Kiesel
ATTORNEY

FIG. 2

INVENTORS L. G. BOSTWICK
J. H. KING
BY
Walter C. Kiesel
ATTORNEY

INVENTORS L. G. BOSTWICK
J. H. KING
BY
Walter C. Kiesel
ATTORNEY

Patented Dec. 3, 1946

2,411,865

UNITED STATES PATENT OFFICE 2,411,865

SUBMARINE SIGNALING DEVICE

Lee G. Bostwick and John H. King, Chatham, N. J., assignors to Bell Telephone Laboratories, Incorporated, New York, N. Y., a corporation of New York Application February 10, 1944, Serial No. 521,782

15 Claims. (Cl. 177—386)

This invention relates to submarine signaling devices and more particularly to high power projectors of the direct radiating diaphragm type especially suitable for the propagation of low frequency signals.

The attainment of high intensity signals in a submarine signaling device of the diaphragm type entails, inter alia, the use of a diaphragm of substantial area and capable of large amplitude vibrations. In addition, in devices operable at low frequencies, the diaphragm must have a supporting or suspension system of low stiffness in order to place the fundamental resonance frequency of the vibrating system low in the frequency range. As a result, when such a device is submerged, and particularly when it is submerged to considerable depth, large amplitude displacements of the diaphragm may occur due to the hydrostatic pressure upon the diaphragm. Such displacements would deleteriously affect the operation of the device and might result in damage to the diaphragm and the supporting or suspension system therefor.

One object of this invention is to substantially prevent net displacement of the diaphragm of a submarine signaling device due to hydrostatic pressures while allowing large amplitude vibrations of the diaphragm in accordance with signal forces applied thereto. More specifically, one object of this invention is to compensate accurately and quickly for variations in hydrostatic pressures acting upon the diaphragm of a submarine signaling device, to maintain the diaphargm in its normal neutral position.

In accordance with one feature of this invention, a submarine signaling device comprising a diaphragm having one surface in communication with the sea and the opposite surface enclosed by a housing, is provided with a chamber or reservoir containing a gas under pressure and with means actuated by the diaphragm for releasing gas from the chamber into the housing or from the housing into the sea to maintain equality between the pressures acting upon the opposite surfaces of the diaphragm.

In accordance with another feature of this invention, the aforesaid means includes a solenoid operated valve coupling the chamber to the interior of the housing and a microswitch for controlling the energizing circuit for the solenoid of the valve, and a mechanical linkage between the diaphragm and the actuating element of the microswitch is provided, the linkage being constructed and arranged so that the switch is operated in response to displacements of the diaphragm due to variations in the hydrostatic pressure thereon but is not actuated in response to vibrations of the diaphragm at frequencies within the operating range of the signaling device.

In accordance with a further and specific feature of this invention, the linkage between the diaphragm and the microswitch includes a mechanical filter element of such parameters that the microswitch will be actuated only in response to displacements of the diaphragm at frequencies below the lowest frequency in the range the signaling device is intended to translate.

In one and particularly advantageous construction, the filter element comprises a spring integral with the diaphragm and coupled to a mechanical resistance defined by a paddle member oscillatable in a body of highly viscous liquid.

The invention and the above-noted and other features thereof will be understood more clearly and fully from the following detailed description with reference to the accompanying drawings in which.

Figure 1:
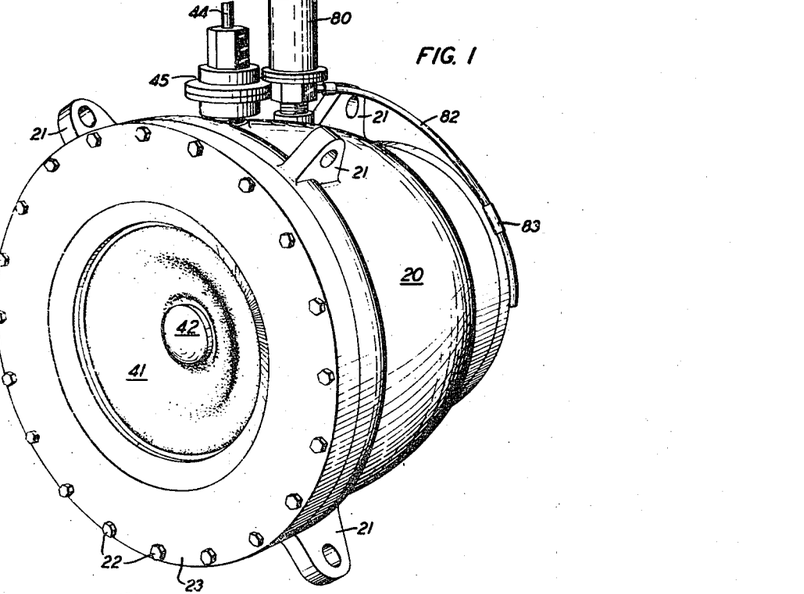
Fig. 1 is a perspective view of a submarine signaling device illustrative of one embodiment of this invention.
Figure 2:
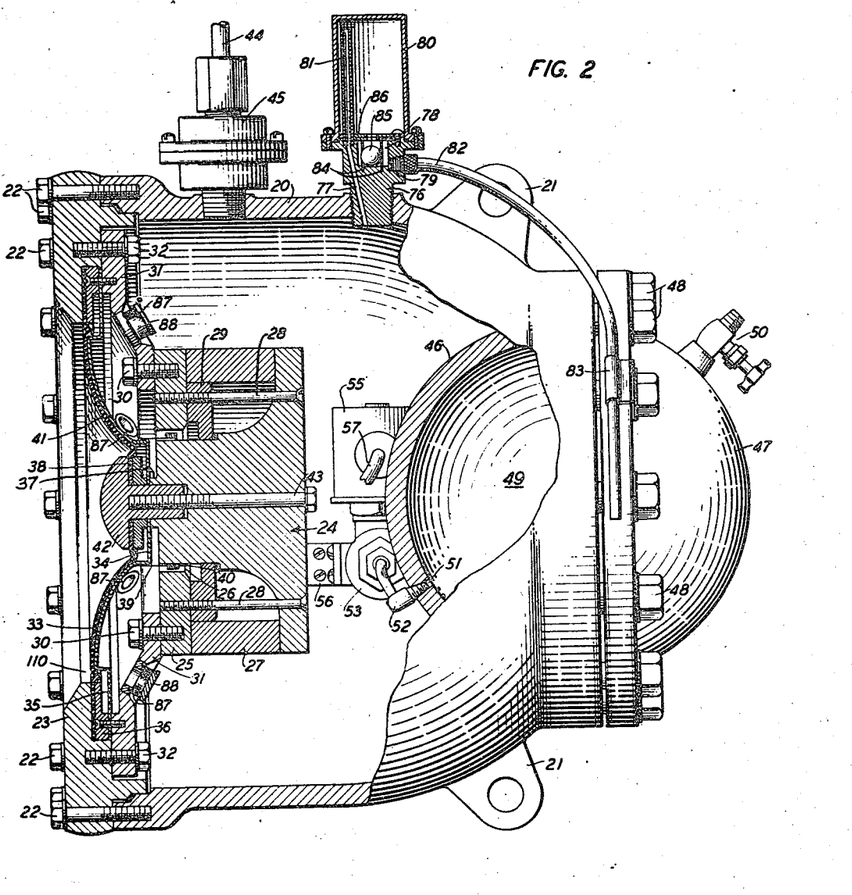
Fig. 2 is a side view mainly in section of the signaling device shown in Fig. 1.

Referring now to the drawings, the submarine signaling device illustrated in Figs. 1 to 6 inclusive comprises a rugged housing 20, for example cast of metal, provided with mounting lugs 21 and having secured in fluid-tight relation to the front end thereof, as by a plurality of bolts 22, an annular face plate 23 which mounts a signal translating unit. This unit, which advantageously is of the moving coil type as shown in Fig. 2, comprises a magnet assembly including coaxial pole-pieces 24 and 25 defining an annular gap 26. The pole-pieces are clamped against opposite ends of a cylindrical permanent magnet 27 by screws 28 and are maintained in accurate coaxial relation by a non-magnetic spacer ring 29.

Secured to the pole-piece 25, as by bolts 30, is a shallow, apertured, dished, non-magnetic frame 31 which is secured also to the face plate 23 as by bolts 32. An annular diaphragm, for example of metal such as beryllium copper, includes an intermediate concavo-convex portion 33 and inner and outer portions 34 and 35, respectively, of sufficient flexibility to allow free vibration of the intermediate portion 33 as a whole analogous to a piston. The peripheral part of the outer portion 35 is clamped to the frame 31 by a ring 36 and the inner edge part of the inner flexible portion 34 is clamped against a protuberance 37 on the pole-piece 24 by a non-magnetic ring 38. The diaphragm has affixed thereto a cylindrical mount 39, for example of insulating material, such as phenol fabric, which extends into the gap 26 and carries a driving coil 40.

Overlying the diaphragm and secured in intimate engagement with the intermediate portion 33 thereof is a protective membrane or diaphragm 41, for example of gum rubber, the peripheral part of which is clamped between the face plate 23 and the ring 36 and the central portion of which is clamped against the ring 38 by a non-magnetic stud 42 fixed in position by a bolt 43. The diaphragm 41 serves as a sound barrier at frequencies up to several hundred cycles per second and has a fluted portion 110 therein to increase its flexibility.

Electrical connection to the coil 40 and to a microswitch described hereinafter may be established by way of a cable, a portion of which is shown at 44 in Fig. 2, which enters the housing 20 through a suitable water-tight stuffing box 45.

When the submarine signaling device is submerged, the diaphragm 33 is subjected to hydrostatic pressures which might deleteriously affect the operating characteristics of the device and which might be of such magnitude, particularly when the device is utilized at great depths, as to distort or even destroy the diaphragm. In accordance with a feature of this invention, means are provided for counteracting the hydrostatic pressure upon the diaphragm to maintain the steady pressures effective upon the two faces of the diaphragm in equilibrium.

As shown in Fig. 2, the housing is provided with a substantially hemispherical wall 46, which may be cast integrally with the housing, and a cover member having a substantially hemispherical wall 47 concentric with the wall 46 is secured in fluid-tight relation to the rear of the housing, as by bolts 48. The two walls 46 and 47 bound a fluid-tight chamber or reservoir 49 into which gas, such as air, under substantial pressure may be introduced through a valve 50 and from which gas may escape into the housing 20 by way of a port 51 in the wall 46. Threaded into the port 51 is a coupler member 52 through which communication is established from the chamber 49 to one side of a solenoid operated valve 53 of conventional construction, the valve having a restricted outlet coupling 54, shown in Fig. 3, in communication with the interior of the housing 20. The valve, together with the solenoid actuating element 55 therefor is supported by a rigid bracket 56 secured to the housing 20. Electrical connection to the solenoid is established by way of a cable 57. The construction is such that normally, that is, when the solenoid is deenergized, the valve is closed, and when the solenoid is energized, the valve is opened and gas from the chamber 49 flows into the housing 20.

Figures 3, 4:
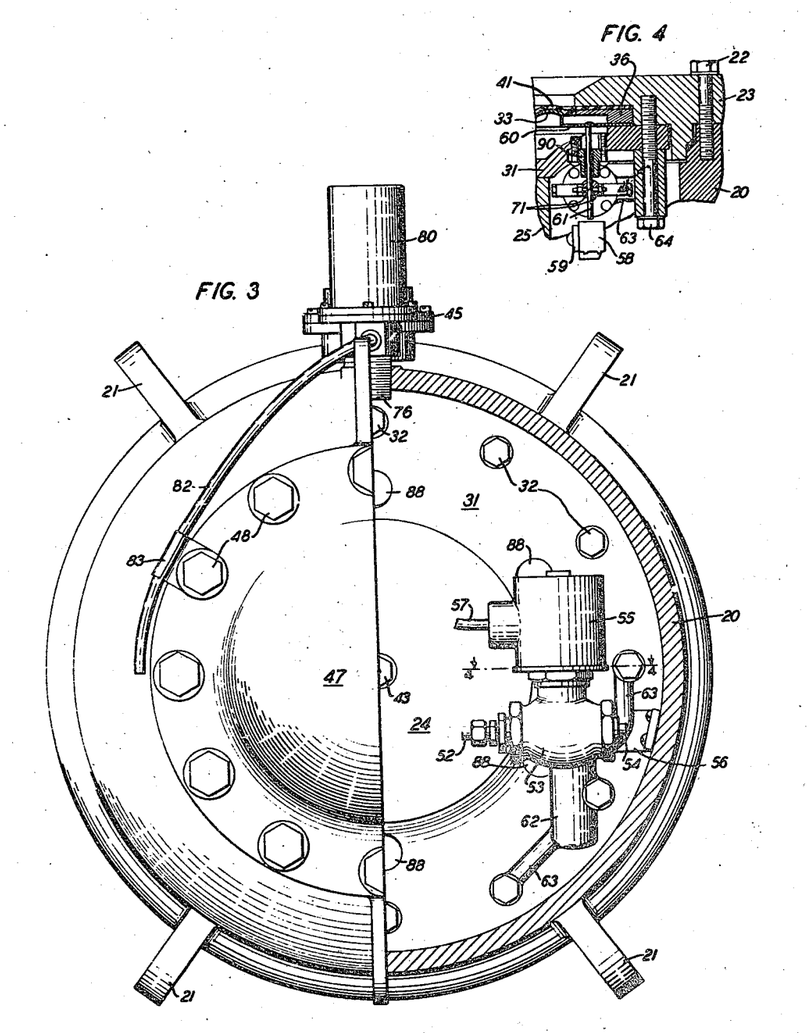
Fig. 3 is a rear view of the device shown in Figs. 1 and 2, a portion of the back of the housing and a part of the reservoir being removed.
Fig. 4 is a detail view in section along plane 4—4 of Fig. 3.
Figures 5, 6:
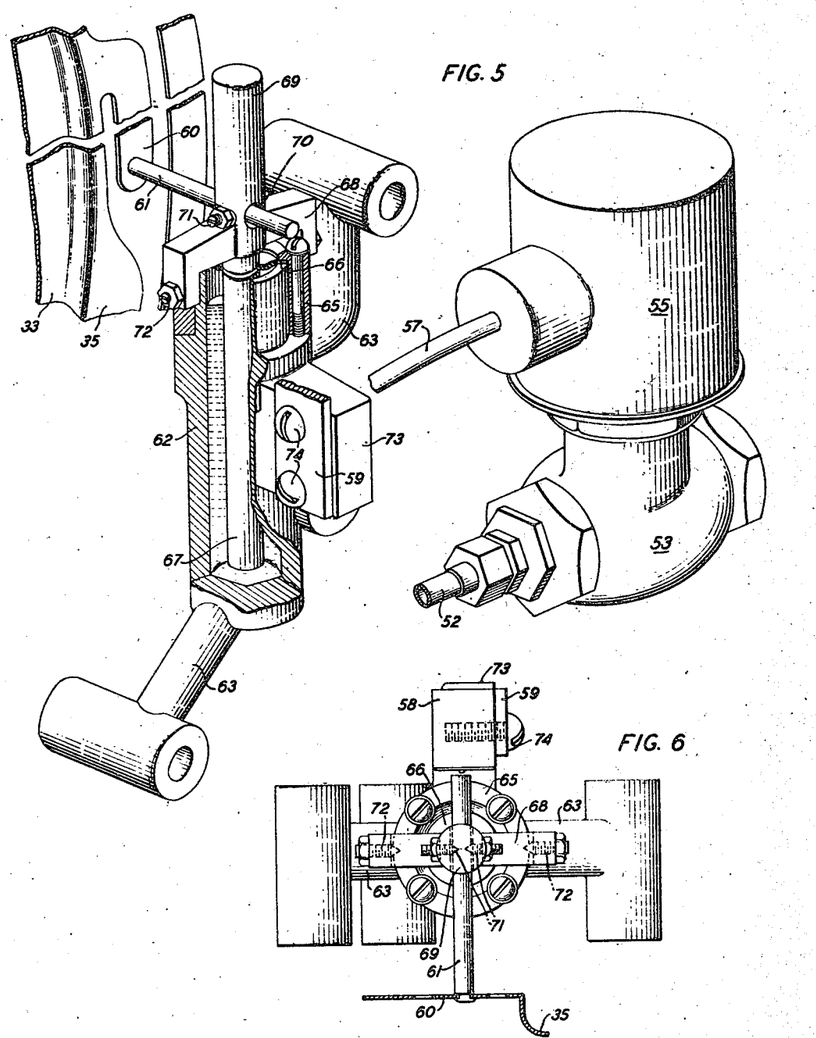
Fig. 5 is a detail perspective view of the solenoid operated valve and the actuating system for the switch therefor, a portion of the mechanical impedance element included in this system being broken away to show details of construction.
Fig. 6 is a top view of the impedance element.

The solenoid energizing circuit includes a microswitch 58, shown in Figs. 4 and 6, which is mounted on a supporting strip 59 and is actuated by a linkage extending from the diaphragm, illustrated in Figs. 4, 5 and 6. As shown most clearly in Fig. 5, the outer flexible portion 35 of the diaphragm includes a finger or spring member 60 to which a drive pin 61 is affixed, the pin extending through but not touching an aperture reducing bushing 90 affixed to the frame 31, and into engagement with the actuating element of the microswitch 58. Associated with the drive pin 61 is a mechanical resistance element which comprises a casing 62 having mounting arms 63 which are secured to the frame 31 and face plate 23 by bolts 64. The casing is partially filled with a highly viscous fluid, for example an oil known commercially as "Vistac," and has affixed thereto by a cap 65 a resilient sealing member 66, for example of neoprene. Immersed in the fluid filling is a cylindrical paddle member 67 which is supported by a rocker element 68 having an arm 69 provided with an aperture 70 through which the drive pin 61 extends. The arm 69 has threaded thereinto a pair of aligned cone pivots 71 engaging the drive pin 61. The rocker element 68 has threaded thereinto a pair of cone pivots 72, which are aligned and positioned substantially in the plane of the sealing member 66 so that the stiffness reaction of the member 66 is minimized and high sensitivity compensation is obtained. Motion of the paddle member 67 through the viscous fluid develops a high mechanical resistance, as is apparent.

The casing 62 is provided with an arm 73 to which the mounting strip 59 for the microswitch 58 is secured by screws 74.

The mechanical resistance element and the spring arm 60 are constructed and arranged so that the rod 61 moves in response to even small changes in the hydrostatic pressure effective upon the diaphragm but remains substantially stationary when the diaphragm vibrates in response to signal currents supplied to the driving coil therefor. The principles involved will be understood from the following considerations.

The rod 61 is moved in response to displacement or motion of the diaphragm, the motion or displacement of the diaphragm being communicated to the rod by way of the spring arm 60. This arm, viewed as a mechanical impedance element, is essentially a stiffness. Associated with the rod and arm is the resistance element which constitutes a resistance in parallel with the stiffness noted. The stiffness and resistance define a mechanical filter so that, as will be apparent, the motion of the rod 61 as a function of frequency will be dependent upon the constants of the filter. These constants may be correlated to effect discrimination against a desired range of frequencies. Specifically, in a device of the construction described, the parameters involved are correlated so that the filter discriminates against frequencies in the intended operating range of the device, whereby the rod 61 is moved in response to steady displacement of the diaphragm or vibration thereof below the operating range, but motion of the rod is prevented in this range. In a particular device of the construction described hereinabove and intended to operate most efficiently in the range from 20 to 350 cycles per second, a filter wherein the stiffness was of approximately $4 \times 10^6$ dynes per centimeter and the resistance average, was approximately $15 \times 10^6$ mechanical ohms at 70° F. has been found effective to prevent motion of the driving pin 61 at frequencies above about 10 cycles per second even though the amplitude of the diaphragm displacement in the operating range was several times that below this range.

When the submarine signaling device is submerged, the diaphragm is displaced inwardly due to the increasing hydrostatic pressure thereon. This displacement of the diaphragm results in motion of the driving pin 61 as described above, so that the microswitch contacts are closed and the solenoid 55 is actuated to open the valve 53, whereby air under pressure flows from the chamber 49 into the housing 20. Thus, the pressure acting upon the rear face of the diaphragm is increased. When the latter pressure is equal to the hydrostatic pressure upon the front face of the diaphragm, the diaphragm is returned to its initial position, the microswitch operates to open the solenoid circuit and the valve 53 closes. Hence, the diaphragm is maintained in its normal neutral position for operation at any desired depth. In a specific construction, it has been found that the mean position of the diaphragm is maintained within ±0.010 inch, while vibrational amplitudes of the diaphragm, in accordance with signals, of at least ten times this value are permitted without operation of the microswitch.

When the signaling device is raised, the pressure within the housing is reduced automatically to maintain equilibrium between the pressures upon opposite sides of the diaphragm. For this purpose, there is provided a vent which comprises a coupler 76 threaded into the housing 20 and having therein a bore 77 and a recess 78, the latter having a port 79 communicating therewith. Secured in water-tight engagement with the coupler 76 is a cap 80 into which a slender tube 81 communicating with the bore 77 extends. A second open-ended slender tube 82 extends from the port 79 and is affixed upon the housing by brackets or clamps 83. Disposed within the recess and positioned by four pins 84 is a floatable ball 85 over which a disc 86 having a restricted central opening is positioned.

When the pressures upon opposite sides of the diaphragm are equal, the hydrostatic pressure within the cap 80 established by way of the tube 82, counterbalances the pressure within the cap due to the air within the housing 20. If the signaling device is raised, the pressure within the housing exceeds the hydrostatic pressure so that air is released from the housing by way of the port 79 and tube 82 until equilibrium between the two pressures is established.

The ball 85 in cooperation with the disc 86 constitutes a check valve to prevent flooding of the cap 80 and flow of water into the housing 20 in the event of failure of the compensation.

As has been noted hereinabove, in a specific device of the construction described, the intended operating range is substantially 20 to 350 cycles per second. In such a device, a number of parameters must be correlated in a particular manner especially if uniformity of response over the operating range and high power capacity are to be realized. Attainment of high power capacity requires the use of a fairly large diaphragm, large vibrational amplitudes and a driving coil capable of dissipating the heat generated therein when signal currents requisite for the vibrational amplitudes involved are supplied thereto. In a specific device intended for operation in the range noted above and capable of producing root mean square sound pressures of the order of 3000 dynes per square centimeter at a distance of 1 foot from the front of the device, a diaphragm wherein the inner and outer diameters of the bodily vibratile portion 33 are approximately 3 inches and 8 inches, respectively, this portion was vibratile at amplitudes of the order of 0.4 centimeter from its neutral position and a driving coil capable of radiating of the order of 125 watts as heat have been found satisfactory.

The response frequency characteristic of the device will be determined by the mechanical constants of the diaphragm and the parameters of the acoustic elements associated therewith. In a construction found particularly satisfactory, the diaphragm constants were such that the resonance frequency of the diaphragm was approximately 23 cycles per second in open water, the effective mass of the vibratory system being approximately 450 grams and the stiffness of the suspension portions 34 and 35 being approximately $48 \times 10^6$ dynes per centimeter. The diaphragm resonance may be damped by a plurality of acoustic resistances, two of which are shown on Fig. 2, each defined by a metallic cylinder 87 provided with a multiplicity of fine slots, fitted in the apertures in the frame 31 and closed at one end by a cap 88. The frame 31 is imperforate except for the openings in which the cylinders 87 are fitted and defines with the diaphragm and the pole pieces a chamber which is made of such small volume that it does not reduce appreciably the flow of air through the apertures within the band of frequencies adjacent the diaphragm resonance frequency. The large chamber bounded by the housing 20 and the frame 31 is made of such volume that variations in its stiffness when the signaling device is submerged to a prescribed depth do not alter the resonance frequency of the vibratory system by more than of the order of 10 per cent. In a specific construction, a chamber having a volume of the order of $19 \times 10^3$ cubic centimeters has been found satisfactory, resulting in a change of not more than 10 per cent in the resonance frequency of the vibrating system when the device is submerged to a depth of 50 feet. With such device, a sound field wherein the pressure is constant within ±1.0 decibel over the operating range from 20 to 350 cycles per second has been obtained.

Figure 7:
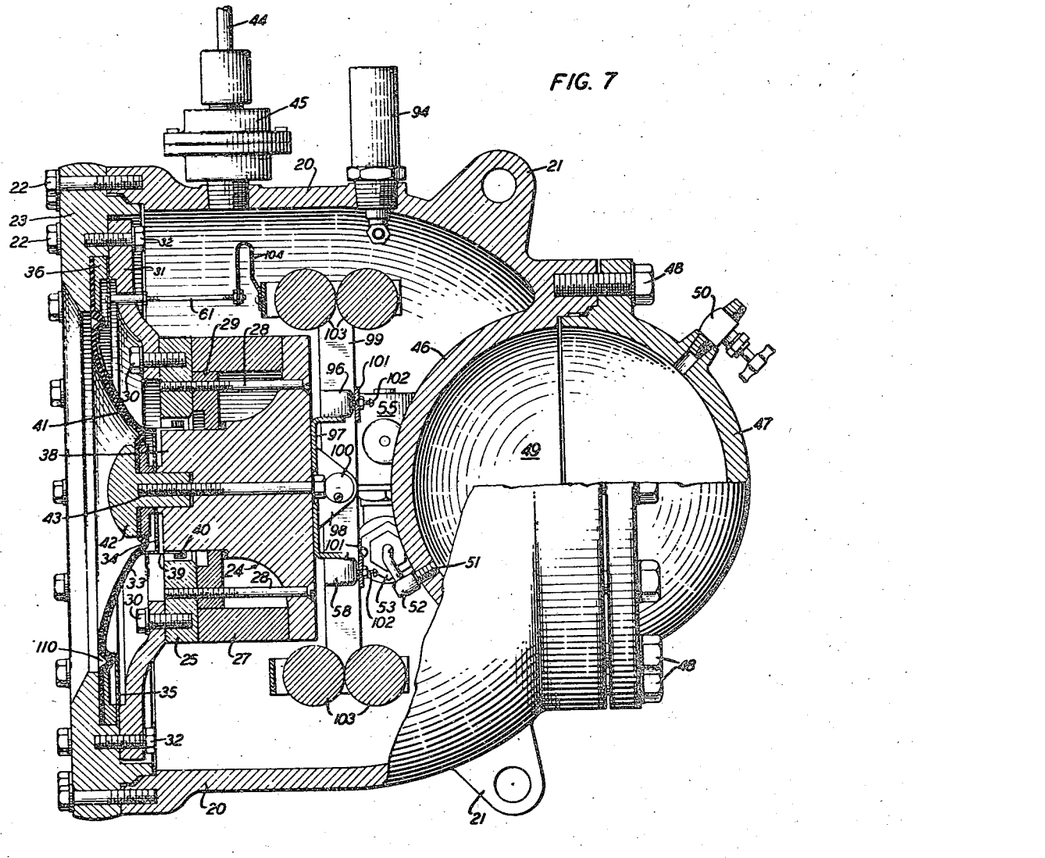
Fig. 7 is a side view mainly in section of a submarine signaling device illustrative of another embodiment of this invention.
Figure 8:
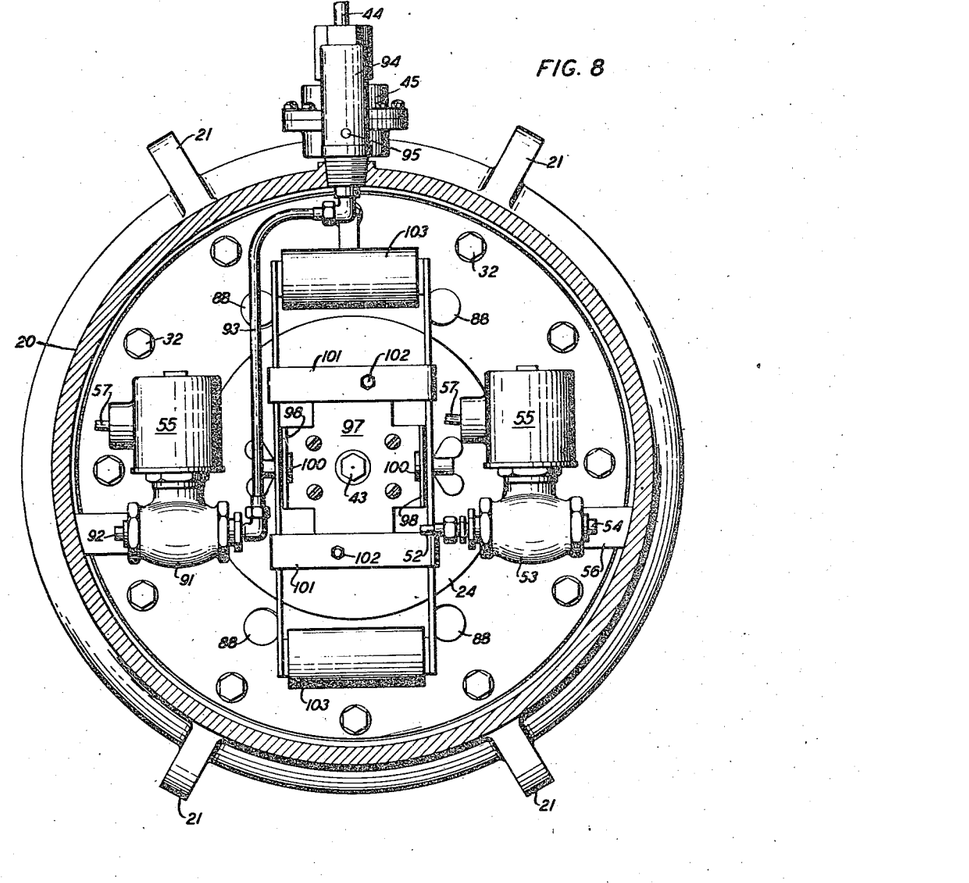
Fig. 8 is a rear view of the device shown in Fig. 7 with a portion of the housing removed.
Figure 9:
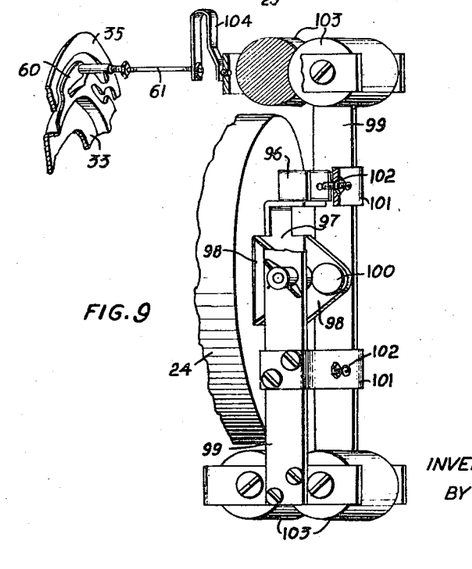
Fig. 9 is a perspective view of the control system for the valves in the device illustrated in Figs. 7 and 8.

The submarine signaling device illustrated in Figs. 7 to 9 is of generally the same construction as that illustrated in Figs. 1 to 6, inclusive, and described hereinabove but differs therefrom in the control system for effecting compensation for variations in the hydrostatic pressure upon the diaphragm. Specifically, the compensating system included in the device illustrated in Figs. 7 to 9 comprises the solenoid controlled valve 53 for allowing flow of air from the reservoir 49 into the interior of the housing 20 to counteract hydrostatic pressures acting upon the diaphragm, and a second solenoid controlled valve 91 having a restricted inlet 92 and having its outlet connected by a pipe 93 to the vent 94, the valve 91, when open, allowing release of air from the interior of the housing 20 when the air pressure within the housing exceeds the hydrostatic pressures upon the diaphragm. The vent 94 may be similar to the vent 80 and provided with an outlet 95. The energizing circuit for the solenoid of valve 53 includes the microswitch 58 and that for the solenoid of valve 91 includes a similar microswitch 96, the two microswitches being mounted upon a support 97 secured to the polepiece 24.

The support 97 comprises parallel arms 98 from which a rocker member 99 is supported by trunnions 100. The rocker member includes a pair of transverse strip members 101 carrying adjustable contactors 102 for engaging the actuating buttons of the microswitches, and carries at its ends weights 103, the purpose of which will be pointed out hereinafter. The rocker member and weights are constructed and arranged so that normally the rocker assembly is balanced with respect to the trunnions and the contacts 102 are spaced slightly from the actuating buttons of the microswitches whereby, normally, both solenoids 55 are deenergized and both the valves 53 and 91 are closed. The rocker 99 is actuated by the drive pin 61 by way of a generally U-shaped spring 104 which has its opposite ends secured to the drive pin and the rocker member.

Briefly, the operation of the compensating system is as follows: As noted heretofore, normally, that is, when the diaphragm is at its neutral position, both valves 53 and 91 are closed. When the signaling device is submerged, due to the increasing hydrostatic pressure thereon the diaphragm is displaced inwardly so that the rocker member 99, driven by the pin 61, is tilted in the clockwise direction to operate the microswitch 58, thus causing the valve 53 to open. Air from the chamber 49 flows into the interior of the housing 20 to counteract the hydrostatic pressure upon the diaphragm, until the diaphragm is returned to its neutral position. If the pressure within the housing 20 exceeds the hydrostatic pressure on the diaphragm, as occurs when the signaling device is raised, the diaphragm moves outwardly so that the rocker member 99 is tilted in the counterclockwise direction to cause operation of the microswitch 96. Consequently, the valve 91 is opened and air escapes from the housing through the vent 94, 95 until the diaphragm is restored again to its neutral position. Thus, equilibrium between the static pressures acting upon the opposite sides of the diaphragm is maintained.

The actuating means for the microswitches constitutes a mechanical system which discriminates between slow or very low frequency displacement of the diaphragm and vibration thereof at higher frequencies, whereby the microswitches are operated only in response to displacement of the diaphragm at frequencies below the lowest frequency in the intended operating frequency range of the signaling device.

It will be apparent from a consideration of the mechanical system involved in the operation of the rocker 99 that the motion of the rocker in relation to frequency of displacement of the diaphragm will be dependent upon the parameters of the rocker, spring 104 and spring arm 60 considered as mechanical impedances. The rocker is essentially a mass, the major portion of which is provided by the weights 103, and the spring 104 and spring arm 60 are essentially stiffnesses. The three elements noted constitute the essential impedances of a mechanical mesh associated with the diaphragm. If these impedances are correlated so that the resonant frequency of the mesh is well below the intended operating range of the device, the rocker 99 will remain substantially stationary when the diaphragm vibrates at frequencies within this range but will be tilted, in the manner described above, in response to changes in hydrostatic pressure upon the diaphragm, to effect operation of the microswitches and thus result in equalization of the pressures acting upon opposite sides of the diaphragm. In a particular device intended for operation in a range of frequencies from 20 cycles per second up, the impedances may be correlated so that the mesh noted is resonant at about 6 cycles per second.

In some cases, dissipating or mechanical resistance elements may be provided in association with the rocker arm 99 to increase the discrimination between vibrations of the diaphragm at the intended operating frequencies of the device and at lower frequencies, as to their effect upon the rocker arm.

Although specific embodiments of the invention have been shown and described, it will be understood that they are but illustrative and that various modifications may be made therein without departing from the scope and spirit of this invention as defined in the appended claims.

What is claimed is:

1. A submarine signaling device comprising a diaphragm having one face for communication with the sea, means defining a chamber with the opposite face of said diaphragm, signal translating means cooperatively associated with said diaphragm, and means for compensating for variations in hydrostatic pressure upon said one face to maintain the pressures on said one and opposite faces substantially equal, said compensating means comprising a reservoir containing a gas under pressure, a normally closed valve between said reservoir and said chamber and means actuated in accordance with displacement of said diaphragm only at frequencies below a preassigned frequency and in the direction corresponding to increase in said hydrostatic pressure for opening said valve.

2. A submarine signaling device comprising a diaphragm having one face for communication with the sea, said diaphragm having a bodily vibratile portion and a flexible mounting portion, means defining a chamber with the opposite face of said diaphragm, signal translating means cooperatively associated with said diaphragm, a reservoir containing a gas under pressure, a valve for coupling said reservoir to said chamber, actuating means for said valve, and means including a driving element coupled to said flexible mounting portion of said diaphragm for operating said actuating means to open said valve when the pressure upon said one face exceeds that upon said opposite face.

3. A signaling device for translating signals within a preassigned operating frequency range, comprising a diaphragm, means defining a chamber with one face of said diaphragm, a reservoir containing a gas under pressure, a valve coupling said reservoir to said chamber, actuating means for said valve, and means for operating said valve in response to displacement of said diaphragm only at frequencies below the operating frequency range of the device, said operating means comprising a driving member coupled to said diaphragm and a mechanical impedance element coupled to said driving member.

4. A signaling device for translating signals within a preassigned operating frequency range, comprising a diaphragm, means defining a chamber with one face of said diaphragm, a reservoir containing a gas under pressure, a valve coupling said reservoir to said chamber, and means for operating said valve only in response to displacement of said diaphragm at frequencies below the operating frequency range of the device, said operating means including a mechanical resistance-stiffness filter actuated by said diaphragm.

5. A signaling device for translating signals within a preassigned operating frequency range, comprising a diaphragm, means defining a chamber with one face of said diaphragm, a reservoir containing a gas under pressure, a valve coupling said reservoir to said chamber, and means for actuating said valve only in response to displacement of said diaphragm at frequencies below the operating frequency range of the device, said actuating means comprising a mechanical linkage actuated in response to displacement of said diaphrgam and including a mass and a stiffness resonant at a frequency below said range.

6. A signaling device for translating signals within a preassigned operating frequency range, comprising a diaphragm, means defining a chamber with one face of said diaphragm, and means for maintaining substantial equilibrium between the pressures upon said one face and the opposite face of said diaphragm, said equilibrium maintaining means comprising means responsive only to displacement of said diaphragm at frequencies below the operating range of the device for increasing the pressure in said chamber when the pressure upon said one face is less than that upon said opposite face and means for decreasing the pressure in said chamber when the pressure upon said one face exceeds that upon said opposite face.

7. A signaling device in accordance with claim 6 wherein said pressure increasing means comprising a reservoir containing a gas under pressure, a valve coupling said reservoir to said chamber, operating means for said valve, and means for actuating said operating means in response to displacement of said diaphragm including a mechanical filter element coupled to said diaphragm.

8. A signaling device in accordance with claim 6 wherein said equilibrium maintaining means comprises a reservoir containing a gas under pressure, a valve coupling said reservoir to said chamber, a venting valve for said chamber, and means for operating said first and second valves to open said first valve when the pressure upon said one face is less than that upon said opposite face and to open said second valve when the pressure upon said one face is greater than that upon said opposite face, said operating means comprising a mechanical impedance element coupled to and actuated in response to displacement of said diaphragm and including mass and stiffness resonant at a frequency below said operating range.

9. A signaling device comprising a diaphragm having a flexible portion, means defining a chamber with one face of said diaphragm, a reservoir containing a gas under pressure, a normally closed solenoid operated valve coupling said reservoir to said chamber, control means for the solenoid including a switch, a driving member coupled to said flexible portion of said diaphragm and to the actuating element of said switch, a container having therein a viscous fluid, a paddle member immersed in said fluid, and means connecting said paddle member to said driving member.

10. A submarine signaling device for translating signals within a preassigned operating frequency range, comprising a diaphragm having one face for communication with the sea, means defining a chamber with the opposite face of said diaphragm, and means for compensating for hydrostatic pressure upon said one face, said means comprising a reservoir containing a gas under pressure, a valve coupling said reservoir to said chamber, means for operating said valve and actuating means for said operating means responsive only to displacement of said diaphragm at frequencies below the operating range of the device, said actuating means including a casing containing a viscous fluid, a paddle member oscillatable in said fluid and a driving connection to said paddle member including a spring actuated by displacement of said diaphragm.

11. A submarine signaling device for translating signals within a preassigned operating frequency range, comprising a diaphragm having one face for communication with the sea, said diaphragm having also a spring portion adjacent its periphery, means defining a chamber with the opposite face of said diaphragm, a reservoir containing a gas under pressure, a solenoid operated valve coupling said reservoir to said chamber, a microswitch for controlling energization of the solenoid for said valve, and means for actuating said switch to effect opening of said valve when the pressure upon said one face is greater than that upon said opposite face, said actuating means being responsive only to displacement of said diaphragm at frequencies below the operating range of the device and comprising a mechanical frequency discriminating linkage including said spring portion, between said diaphragm and the actuating element of said switch.

12. A submarine signaling device in accordance with claim 11 wherein said linkage includes in addition to said spring portion a highly viscous body and a paddle member immersed in said body and connected to said spring portion.

13. A submarine signaling device in accordance with claim 11 wherein said linkage comprises in addition to said spring portion a stiffness element and a mass element, the combination of said stiffness and mass elements and said spring portion being resonant at a frequency below said operating range.

14. A submarine signaling device for translating signals within a preassigned operating frequency range, comprising a diaphragm one face of which is adapted to be exposed to the sea, signal translating means cooperatively associated with said diaphragm, means defining with said diaphragm a chamber opposite the other face thereof, a second chamber containing a gas under pressure, valve means connecting said chambers, relief valve means associated with said first chamber, actuating means operable in response to displacement of said diaphragm for controlling said first and relief valve means to maintain the pressure upon said other face of said diaphragm substantially equal to the pressure on said one face thereof, and means for preventing operation of said actuating means in response to vibrations of said diaphragm at frequencies within the operating range of the device.

15. A submarine signaling device for translating signals within a preassigned operating frequency range, comprising a diaphragm having one face for communication with the sea, means defining a chamber with the opposite face of said diaphragm, a first solenoid operated valve for venting said chamber, a microswitch for the solenoid of said first valve, a reservoir containing a gas under pressure, a second solenoid operated valve coupling said reservoir to said chamber, a second microswitch for the solenoid of said second valve, a rocker member for operating said first and second switches, means for tilting said rocker member to actuate said first switch when the pressure upon said opposite face exceeds that upon said one face and to actuate said second switch when the pressure upon said one face exceeds that upon said opposite face, said tilting means including a connection between said diaphragm and said rocker member and having a stiffness therein, and mass means carried by said rocker member and resonant with said stiffness at a frequency below the operating range of the device.

LEE G. BOSTWICK.
JOHN H. KING.